Sept. 4, 1923.  1,466,916
F. J. PEARL
FISHING TOOL
Filed Oct. 17, 1921
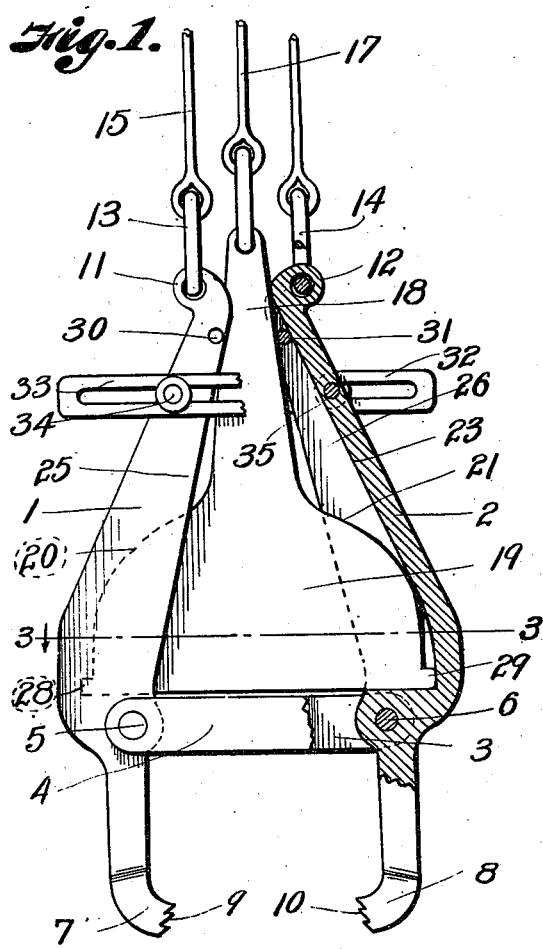
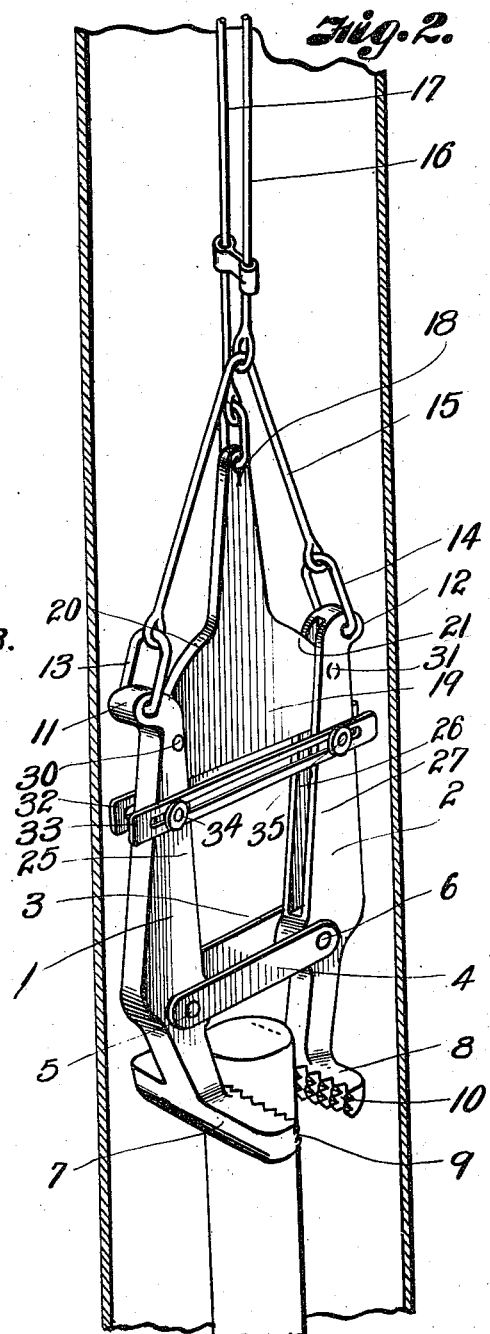
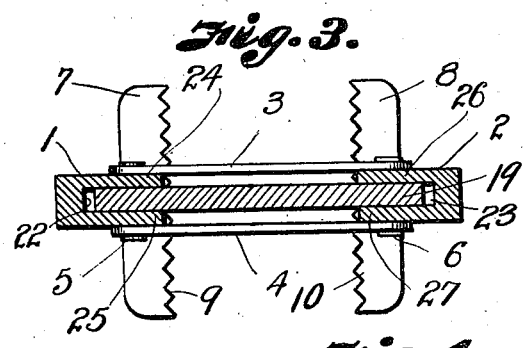
INVENTOR
Fred J. Pearl.
BY
ATTORNEY Patented Sept. 4, 1923.

1,466,916

UNITED STATES PATENT OFFICE.

FRED J. PEARL, OF KANSAS CITY, MISSOURI.

FISHING TOOL.

Application filed October 17, 1921. Serial No. 508,147.

*To all whom it may concern:*

Be it known that I, FRED J. PEARL, a citizen of the United States, residing at Kansas City, in the county of Jackson and State of Missouri, have invented certain new and useful Improvements in Fishing Tools; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a fishing tool particularly designed for recovering tools, cables and the like from wells.

The primary object of the invention is to provide a fishing tool which may be lowered into a well (for example, an oil well) for the purpose of recovering cable, tools and the like and one of the important features of the invention is the provision of means whereby two complementary jaws may be spread apart to receive between them the article to be recovered and then the jaws can be retracted or brought together so that they will grip the tool, cable or other object and so that as the fishing tool is raised, the article to be recovered will be raised with it.

Means are provided whereby the jaws can be operated from a distant point through the medium of a flexible connection so that they may be manually controlled to move toward and away with respect one to the other, thereby assuming gripping position or moving out of gripping position under the control of the operator.

The structure of the device is such that the gripping action of the jaws will increase in proportion to the weight of the object gripped so that liability of the jaws slipping will be eliminated and I may provide each jaw with one or more rows of object-engaging teeth to increase the gripping action of the tool.

The specific construction of the embodiment of my invention selected for illustrative purposes will be apparent by reference to the following description in connection with the accompanying drawings, in which—

Fig. 1 is a view partly in elevation and partly in section of a fishing tool constructed in accordance with my invention.

Fig. 2 is a perspective view of the invention in operation.

Fig. 3 is a sectional view on the line 3—3 of Fig. 1, and

Fig. 4 is a detail view of a slightly modified form of jaw.

Referring now to the drawings by numerals of reference:

1 and 2 designate two jaw-actuating levers pivoted intermediate their ends to the connecting links 3 and 4 by pivots 5 and 6. On the lower ends of the levers 1 and 2 are transverse jaws 7 and 8, the inner faces 9 and 10 of which are provided with teeth to engage the article to be recovered. The upper ends of the levers are provided with perforate ears or portions 11 and 12 to be engaged by the links 13 and 14, connected by a flexible connection 15, to which may be secured an operating cord or cable 16.

The cable 16 can be operated to draw the ends 11 and 12 of the levers 1 and 2 together and expand the jaws 7 and 8, but the jaws 7 and 8 can be retracted by a jaw retractor co-operating with the levers 1 and 2 and controlled by an operating cable 17, fastened to the constricted end 18 of the retractor 19.

The retractor 19 is shown as consisting of a blade having curved edges 20 and 21 to ride against the inner faces 22 and 23 of the levers 1 and 2 and guided in such position by the side flanges 24, 25, 26 and 27, the flanges in connection with the faces 22 and 23 constituting grooves to receive the edges of the retractor blade 19. Therefore, the blade will be guided vertically with respect to the levers 1 and 2 to maintain operative position with respect thereto and the lower portion of the blade 19 is shown as having offset projections 28 and 29, adapted to contact with the pins 30 and 31 on the levers 1 and 2 so as to limit the upward movement of the retractor blade.

The outward swinging movement of the upper ends of the arms or levers 1 and 2 are limited by the slotted stop bars 32 and 33, which are engaged by the pins 34 and 35, which extend through the levers 1 and 2 and have ends which ride in the slots of the bars 32 and 33.

Therefore, when the tool is lowered into the well, it is manipulated with the jaws spread apart until they are arranged with the object to be recovered between them. In this position the retractor blade 19 is in the position shown in Fig. 1. When the tool is properly positioned, the operator pulls on the cable 17 so as to raise the blade or retractor away from the jaws 7 and 8, spreading the upper ends of the levers 1 and 2 apart and moving the jaw members 7 and 8 together to impinge upon and grip the article to be recovered. The operator then raises the fishing tool through the medium of the cable 17, so the greater the weight of the object to be recovered, the greater the gripping action of the jaws 7 and 8.

When the object to be recovered has been raised to the top of the well, the retractor blade 19 can be caused to assume the position shown in Fig. 1 with the jaws 7 and 8 spread apart to release the object previously held.

In Fig. 4 I have shown a slightly modified form of lever with a supplemental jaw 36 depending from the bottom of the jaw 7 or 8, as the case may be, so that two gripping actions can be had upon the object to be recovered. In other respects, the device constructed with the modification shown in Fig. 4, will be like that shown in Figs. 1, 2 and 3.

It will be apparent from the foregoing that the device can be easily constructed, that it may be conveniently lowered into the well and that it is conveniently operable from the cables 16 and 17. Therefore, it is possible to manually manipulate the device so that the jaws will remain open until they have received the article to be recovered between them, thereupon they may be caused to clamp the article and it may be raised from the well through the medium of the cables 16 and 17.

What I claim and desire to secure by Letters-Patent is:

1. A fishing tool comprising two substantially parallel jaw-carrying levers having jaws at their lower ends and provided with outwardly movable upper ends to bring the jaws together, a pair of cross bars pivotally connecting the levers together, a vertically movable lever expander for moving the upper ends of the levers apart, the expander comprising a weight adapted to gravitate out of lever-expanding position, and a cable connected to the expander to be manipulated from the top of the well to raise the same into lever-expanding position.

2. A fishing tool for oil wells comprising two spaced levers, complementary clamping jaws at the bottom ends of the levers, the upper ends of the levers being provided with guides, transverse cross bars pivotally connecting the levers together in spaced relation, and an expanding plate in the guides for forcing the upper ends of the levers apart when the plate is moved in one direction and permitting the levers to move one toward the other when the plate is moved in the opposite direction.

3. A fishing tool for oil wells comprising two levers, links for supporting the levers in pivotal relation one to the other, guides at the inner edges of the levers, clamping jaws at the bottom of the levers, and a reciprocatory plate in the guides and movable in one direction to force the ends of the levers apart to bring the clamping jaws one toward the other.

In testimony whereof I affix my signature.

FRED J. PEARL.